M. Judd,

Window Button.

No. 3915. Reissued Apr: 12. 1870.

Witnesses.

F. T. Stanley

S. E. Lane

Morton Judd

H. PETERS, PHOTO-LITHOGRAPHER, WASHINGTON, D. C.

BEST AVAILABLE COPY

United States Patent Office.

THE JUDD MANUFACTURING COMPANY, OF NEW HAVEN, CONNECTICUT, ASSIGNEES OF MORTON JUDD.

*Letters Patent No.* 39,052, *dated June* 30, 1863; *reissue No.* 3,915, *dated April* 12, 1870.

IMPROVEMENT IN SASH-FASTENERS.

The Schedule referred to in these Letters Patent and making part of the same

*To all whom it may concern:*

Be it known that MORTON JUDD, of New Britain, in the county of Hartford and State of Connecticut, did invent a certain new and useful Improvement in Sash-Fasteners, and the following is declared to be a full, clear, and exact description of the said invention.

The nature of this invention consists in a peculiar construction of joint at the back end of the lever, at the point of connection to the plate on the sash, whereby greater strength is obtained at this point than heretofore, at the same time that the parts are very easily and cheaply constructed, and a short helical spring is applied around the fulcrum-pin of this lever, to produce sufficient friction to prevent the lever turning too freely.

In the drawing—

Figure 2:
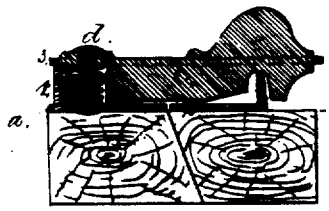
Figure 2 is a vertical section of the same.
Figure 1:
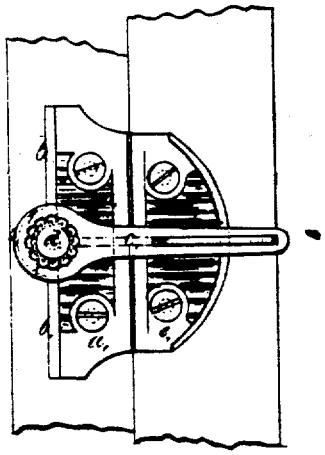
Figure 1 is a plan of said fastener.

The plate *a* is made with a flange, *b*, at the back edge, and to this plate *a* the lever *c* is attached by the rivet or screw *d*, that also forms the fulcrum for the lever *c* to be swung upon.

The back of the lever *c* projects in the form of a flange, 3, that rests upon the flange *b*, so that the strain upon the sash-fastener by any effort to open the window, is taken by tension upon the pin *d*, the projection 3 resting upon the flange *b*, and supporting the joint of the lever as firmly as in those sash-fasteners that have before been made with the joint of the lever between the main plate and an overhanging flange or plate.

The hub 2 of the lever *c* is hollow, and contains a helical spring, 4, which, setting around the pin *d*, and resting at the lower end upon the plate *a*, produces a sufficient friction to hold the lever *c* in any position in which it may be placed, and this hub 2 is within the curved portion 1 of the flange *b*.

*e* is the plate on the other part of the sash or casing to the plate *a*, and over which plate the said lever *c* is turned to secure the sashes.

By this construction a sash-fastener can be made of cast-metal, at a very cheap rate, because there is very little hand labor required on the said fastener.

What is claimed as the invention of the said MORTON JUDD, is—

1. The lever *c* and projection 3, in combination with the plate *a* and flange *b*, substantially as specified.

2. The hollow hub 2 and helical friction-spring 4, operating longitudinally of the axis, in combination with the sash-fastener lever *c* and plate *a*, substantially as and for the purposes specified.

Signed this 26th day of January, A. D. 1870.

MORTON JUDD, *Pres.*
A. D. JUDD, *Sec'y.*

Witnesses:
CHARLES IVES,
JOHN W. ALLING.